United States Patent

Shinkai

[11] Patent Number: 5,204,747
[45] Date of Patent: Apr. 20, 1993

[54] APERTURE COMPENSATION CIRCUIT
[75] Inventor: Kinya Shinkai, Kanagawa, Japan
[73] Assignee: Sony Corporation, Tokyo, Japan
[21] Appl. No.: 838,108
[22] Filed: Feb. 20, 1992
[30] Foreign Application Priority Data
  Feb. 20, 1991 [JP] Japan .................. 2-026353
[51] Int. Cl.$^5$ ............................................. H04N 5/208
[52] U.S. Cl. .................................. 358/162; 358/166
[58] Field of Search ....................... 358/162, 166, 37
[56] References Cited
  U.S. PATENT DOCUMENTS 4,223,342  9/1980  Tsuchiya et al. .................. 358/37
  4,410,912 10/1983  Hess et al. ....................... 358/162
  4,802,010  1/1989  Skinner et al. ................... 358/162

FOREIGN PATENT DOCUMENTS 2064731 7/1972 Fed. Rep. of Germany ........ 358/37
  0120290 9/1980 Japan ................................ 358/37

*Primary Examiner*—James J. Groody
*Assistant Examiner*—David E. Harvey
*Attorney, Agent, or Firm*—Lewis H. Eslinger; Jay H. Maioli

[57] ABSTRACT

An aperture compensation circuit which includes a first differentiating circuit for differentiating an input signal to its input terminal to provide a primary differentiated signal, a squaring circuit for squaring the primary differentiated signal to provide a first signal, a second differentiating circuit for differentiating the primary differentiated signal from the first differentiating circuit to provide a secondary differentiated signal as a second signal, and a dividing circuit for dividing the first signal by the second to provide a contour compensation signal which is not affected by the steepness degree of the input signal.

2 Claims, 3 Drawing Sheets

FIG. 2A  Input Signal E(t)

FIG. 2B  Primary Differentiated Signal E'(t)

FIG. 2C  Squared Signal $[E'(t)]^2$

FIG. 2D  Secondary Differentiated Signal E''(t)

FIG. 2E  Divided Output $\dfrac{-[E'(t)]^2}{E''(t)}$

FIG. 2F  Output Signal $E(t) - \dfrac{[E'(t)]^2}{E''(t)}$

| Cut-Off Frequency | fc = 1MHz | fc = 2MHz | fc = 4MHz |
|---|---|---|---|
| A $E(t)=K\cdot fc\int_{-\infty}^{t}e^{-(\pi fct)^2}dt$ | | | |
| B $E'(t)\propto fc\, e^{-(\pi fct)^2}$ | | | |
| C $E''(t)\propto -fc^2(\pi fct)e^{-(\pi fct)^2}$ | | | |
| D $E(t)-E''(t)$ | | | |
| E $\dfrac{[E'(t)]^2}{E''(t)}\propto \dfrac{1-(\pi fct)^2}{(\pi fct)}e$ | | | |
| F $E(t)-\dfrac{[E'(t)]^2}{E''(t)}$ | | | |

APERTURE COMPENSATION CIRCUIT

BACKGROUND OF THE INVENTION

1. Field of the Invention

The present invention relates to an aperture (contour) compensation circuit for use with a television receiver or the like.

2. Description of the Related Art

A conventional contour compensation circuit for use with for example, television receivers is known to employ a secondary differentiated signal E''(t) of an input video signal E(t). Such secondary differentiated signal E''(t) is increased in level in proportion to the square of the leading edge of the waveform of the video signal E(t). As a consequence, the edge portion is zigzagged at the steep contour portion while a contour compensation becomes insufficient at the gentle contour portion. In other words, the contour compensation by using the secondary differentiated signal E''(t) becomes too much or insufficient depending on the waveform of the input video signal E(t).

OBJECTS AND SUMMARY OF THE INVENTION

Therefore, it is an object of the present invention to provide an improved aperture or contour compensation circuit in which the aforesaid shortcomings and disadvantages encountered with the prior art can be eliminated.

More specifically, it is an object of the present invention to provide an aperture compensation circuit in which a contour portion of an image can be improved ideally.

As an aspect of the present invention, an aperture compensation circuit is comprised of a first differentiating circuit for differentiating an input video signal to provide a primary differentiated signal, a squaring circuit for squaring the primary differentiated signal to provide a first signal $[E'(t)]^2$, a second differentiating circuit for differentiating the primary differentiated signal to provide a secondary differentiated signal, and a dividing circuit for dividing the first signal by the second signal to provide a third signal and a squaring circuit for superimposing the third signal on the input video signal to compensate for the video signal.

BRIEF DESCRIPTION OF THE DRAWINGS

A better understanding of other objects, features, and advantages of the present invention can be gained from a consideration of the following detailed description of an illustrative embodiment thereof, in conjunction with the accompanying drawings in which.

DESCRIPTION OF THE PREFERRED EMBODIMENT

Figure 1:
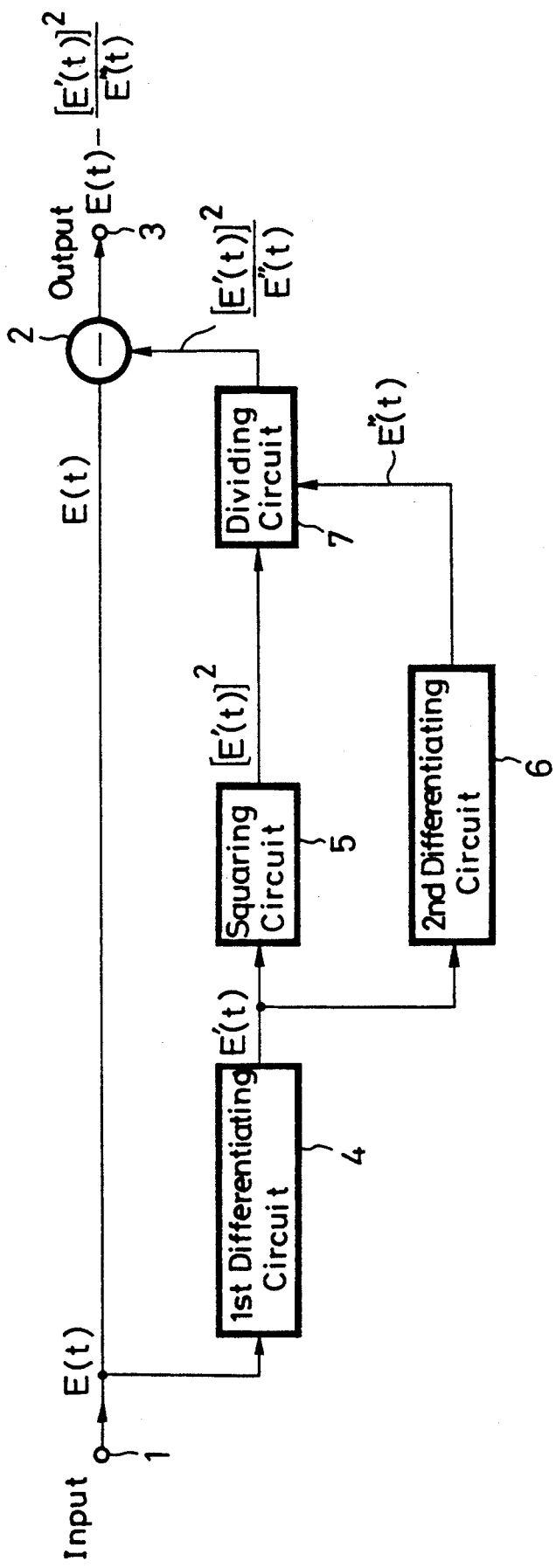
FIG. 1 is a schematic block diagram showing an embodiment of an aperture correction circuit according to the present invention.

Referring now to the drawings in detail, and initially to FIG. 1 which shows an embodiment of the present invention, a video signal E(t) is applied to an input terminal 1, and the signal from the input terminal 1 is supplied through a subtracter 2 to an output terminal 3. Simultaneously, the video signal E(t) applied to the input terminal 1 is supplied to a differentiating circuit 4, in which it is differentiated to provide a primary differentiated signal E'(t). This primary differentiated signal E'(t) is supplied to a squaring circuit 5, in which it is squared to provide a signal $[E'(t)]^2$. Also, the primary differentiated signal E'(t) is supplied to another differentiating circuit 6, in which it is differentiated again to provide a secondary differentiated signal E''(t) of the video signal E(t). Further, the signal $[E'(t)]^2$ from the squaring circuit 5 and the secondary differentiated signal E''(t) from the differentiating circuit 6 are both supplied to a divider 7, in which the former is divided by the latter to provide a signal $[E'(t)]^2/E''(t)$. The signal $[E'(t)]^2/E''(t)$ is supplied to the subtracter 2 and is thereby subtracted from the video signal E(t) from the input terminal 1.

Figure 2:
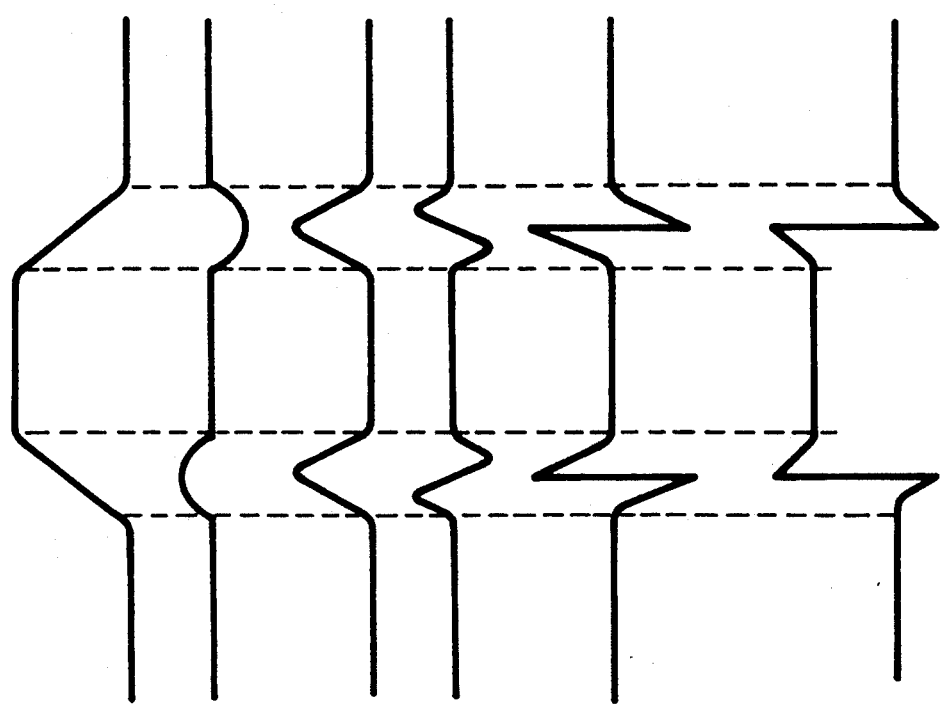
FIGS. 2A through 2F are respectively waveform diagrams of respective signals in the present invention, and to which references will be made in explaining operation of the present invention.

More specifically, when then input signal (voltage) E(t) shown in FIG. 2A, for example, is supplied to the input terminal, then the differentiating circuit 4 derives the primary differentiated signal E'(t) whose waveform is illustrated in FIG. 2B. This primary differentiated signal E'(t) is squared by the squaring circuit 5 to provide the signal $[E'(t)]^2$ whose waveform is shown in FIG. 2C. Also, the differentiating circuit 6 derives the secondary differentiated signal E''(t) whose waveform is shown in FIG. 2D. Further, the signal $[E'(t)]^2$ and the secondary differentiated signal E''(t) are supplied to the divider 7 which then derives the signal $[E'(t)]^2/E''(t)$ whose waveform is shown in FIG. 2E. This signal $[E'(t)]^2/E''(t)$ is subtracted from the input signal E(t) by the subtracter 2, whereby an output signal (voltage) $E(t) - [E'(t)]^2/E''(t)$ shown in FIG. 2F is developed at the output terminal 3.

Accordingly, in this circuit arrangement, the waveform of the signal $[E'(t)]^2/E''(t)$ delivered from the divider 7 is not related to the steepness of the leading edge of the video signal and is proportional only to the amplitude value of the video signal, which can solve the aforesaid problems encountered with the prior art. Further, since the waveform of this signal changes rapidly at the contour portion of the video signal, the contour portion of the image can be improved ideally.

As described above, according to the apparatus of the present invention, since the contour of the image is compensated by the signal proportional only to the amplitude of the video signal and which is not affected by the degree of steep, the contour portion of the image can be improved ideally.

Figure 3:
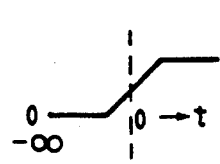
FIG. 3 is a table used to explain the present invention.

That is, in the above-mentioned apparatus, assuming that the video input signal is a unit step function signal passed through a Gaussian filter G ($\omega$), then the video input signal can be expressed by the following equation:

$$\text{Video input signal } E(t) = \frac{a}{\sqrt{\pi}} \int_{-\infty}^{t} e^{a^2 t^2} dt \quad (1)$$

where a is a coefficient related to the leading edge of the video signal. Assuming that fc is a cut-off frequency of the Gaussian filter, a ∝ fc is satisfied (see A at FIG. 3).

On the other hand, the conventional contour compensating is carried out such that a secondary differentiated signal of the video input signal in the equation (1) is provided, phase-inverted and then added to the video input signal. Here, the secondary differentiated is expressed by the following equation:

$$\text{secondary differentiated signal } E''(t) = -K_1 a^2 (at) e^{-(at)^2} \quad (2)$$

($K_1$: constant)

That is, considering that at is normalized, then this secondary differentiated signal becomes large in proportion to the square of a (a is large in proportion to the degree of steep of the video signal). This relation is disadvantageous in compensating a contour of the video signal (see B through D at FIG. 3).

Therefore, in the above-mentioned apparatus of the present invention, the contour compensation waveform is made by the expression $[E'(t)]^2/E''(t)$, which is expressed as follows:

$$\frac{[E'(t)]^2}{E''(t)} = -\frac{K_2}{at} e^{-(at)^2} \quad (3)$$

($K_2$: constant)

Accordingly, normalizing at, the maximum value of this waveform is constant regardless of at. That is, the contour compensation is not related to the steep degree of the leading edge of the waveform (see E at FIG. 3). Further, this waveform is steeper than the waveform of the conventional secondary differentiated signal which is gently curved at its central portion, whereby the contour of the video signal can be compensated ideally (see F at FIG. 3).

According to this invention, since the contour of the video signal is compensated by the signal proportional only to the amplitude of the video signal and which is not affected by the degree of steepness thereof, the contour portion of the image can be improved ideally.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. An aperture compensation circuit comprising:
   (a) first differentiating means for differentiating an input video signal to provide a primary differentiated signal;
   (b) squaring means for squaring said primary differentiated signal to provide a first signal $[E'(t)]^2$;
   (c) second differentiating means for differentiating said primary differentiated signal to provide a secondary differentiated signal as a second signal;
   (d) dividing means for dividing said first signal by said second signal to provide a third signal; and
   (e) means for superimposing said third signal on said input video signal to compensate for a contour of the video signal.

2. An aperture compensation circuit according to claim 1, wherein said superimposing means is a subtracter in which said third signal is subtracted from said input video signal.

* * * * *